United States Patent [19]

Hirata

[11] 4,158,801
[45] Jun. 19, 1979

[54] CONTROL SYSTEM OF ALTERNATING CURRENT MOTORS

[75] Inventor: Akio Hirata, Koganei, Japan

[73] Assignee: Tokyo Shibaura Denki Kabushiki Kaisha, Kanagawa, Japan

[21] Appl. No.: 875,876

[22] Filed: Feb. 7, 1978

[51] Int. Cl.² .............................................. H02P 7/36
[52] U.S. Cl. ...................................... 318/801; 318/809
[58] Field of Search ........ 318/227, 230, 231, 799–801, 318/809

[56] References Cited

U.S. PATENT DOCUMENTS

| | | | |
|---|---|---|---|
| 3,593,083 | 7/1971 | Blaschke | 318/227 |
| 3,700,986 | 10/1972 | Cushman et al. | 318/227 |
| 3,851,234 | 11/1974 | Hoffman et al. | 318/227 |
| 3,896,356 | 7/1975 | Hoffman et al. | 318/227 |
| 3,919,609 | 11/1975 | Klautschek et al. | 318/227 |
| 4,041,361 | 8/1977 | Cornell | 318/227 |
| 4,088,934 | 5/1978 | D'Atre et al. | 318/227 |
| 4,088,935 | 5/1978 | D'Atre et al. | 318/227 |

*Primary Examiner*—Gene Z. Rubinson
*Attorney, Agent, or Firm*—Stevens, Davis, Miller & Mosher

[57] ABSTRACT

In a control system of an alternating current motor energized by a frequency converter including serially connected rectifier and inverter of the type wherein the speed of the motor is controlled by varying the phase of the output current of the inverter by varying the phase of a control signal of the inverter, there are provided a function generator which is supplied with a signal related to the motor torque for generating an analog phase angle signal related to the current phase angle, and a phase shifter responsive to the analog phase angle signal for shifting the phase of the control signal for the inverter.

6 Claims, 14 Drawing Figures

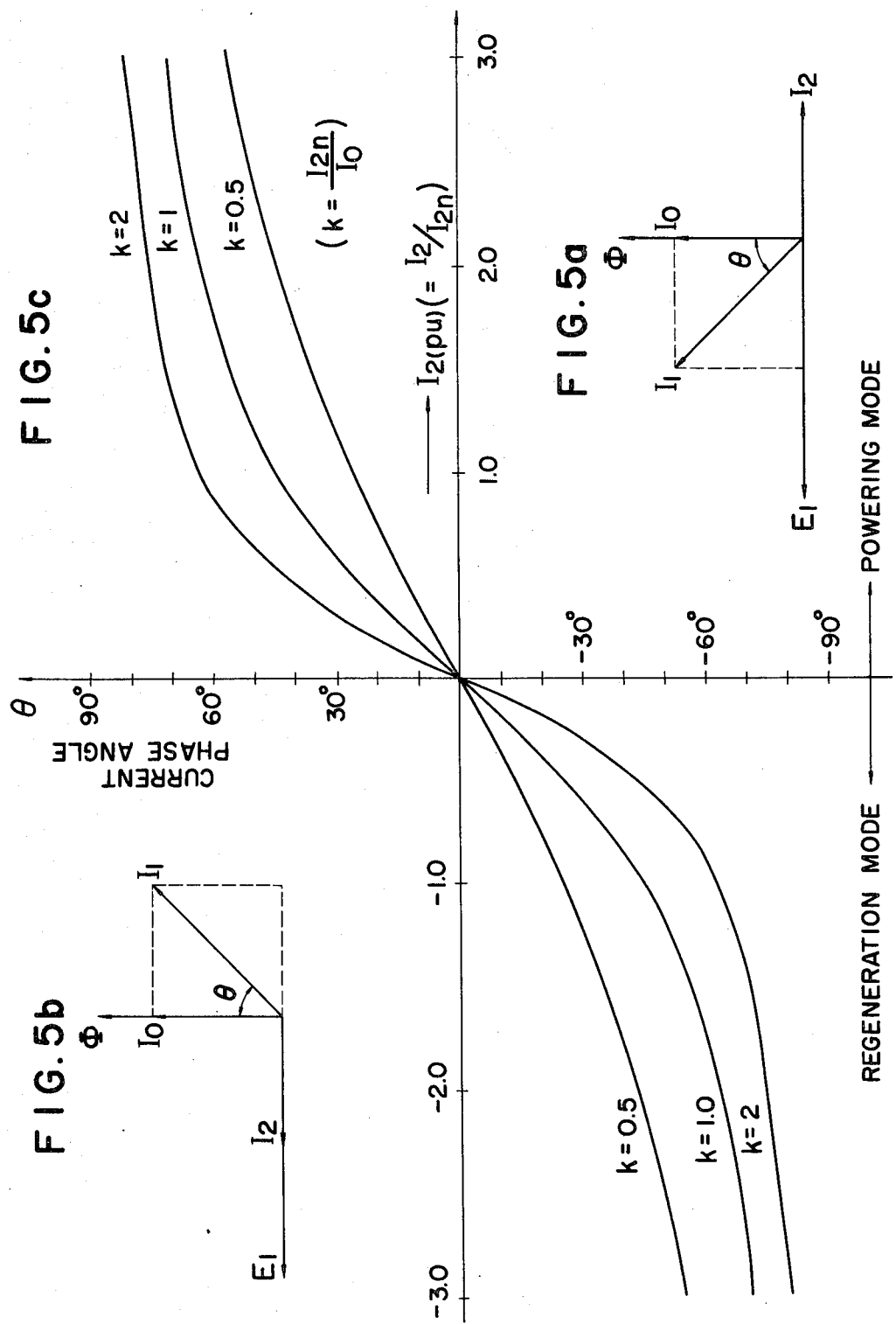

CONTROL SYSTEM OF ALTERNATING CURRENT MOTORS

BACKGROUND OF THE INVENTION

This invention relates to a conrol system of an alternating current motor, and more particularly to a system of controlling the speed of an AC motor by using a frequency converter including serially connected rectifier and inverter.

As shown in FIG. 1, an induction motor 15 is energized by an AC power source 11 through a rectifier 12, a DC reactor 13 and an inverter 14. The rectifier and inverter comprise semiconductor switching elements such as thyristors or power transistors.

One example of the prior art control system is constructed as shown in FIG. 1 in which the outputs of a speed reference setter in the form of a variable resistor 21 and of a speed detector in the form of a tachometer generator 16 coupled to an induction motor 15 are compared by a comparator 100. In response to the output of the comparator 100 a speed controller 22 applies a speed control signal to an absolute value convertor 23 and a function generator 27, the former forming a current instruction signal and the latter a slip frequency instruction signal.

The current instruction signal is compared with a current signal detected by a current transformer 101 by means of a comparator 102, and the result of comparison is applied to a current controller 24 to form a current control signal which is applied to a phase controller 25 for controlling the ignition of the thyristors of the rectifier.

The slip frequency instruction signal is compared with the output of the speed detector 16 by means of a comparator 103 and the result of comparison is applied to an oscillator 29 to form a pulse signal. The frequency of this pulse signal is divided by a frequency divider 30 and the output thereof is applied to a pulse amplifier 32 for controlling the ignition of the thyristors of the inverter 14.

With the control system described above, the slip frequency and the secondary current of the induction motor 15 are controlled in a predetermined correlated manner so as to maintain the magnetic flux of the motor at a substantially constant valve.

FIGS. 2a and 2b are vector diagrams showing the powering and regeneration mode operations of the motor, in which $\Phi$ represents the magnetic flux, $E_1$ the primary voltage, $I_1$ the primary current, $E_2$ the secondary induced voltage, $I_2$ the secondary current, $I_0$ the exciting current, $\phi$ the power factor angle, and $\theta$ the angle between the magnetic flux $\Phi$ and the primary current $I_1$ and termed a current phase angle.

When the speed of an alternating current motor is controlled by a current control type frequency converter described above, the current phase of the primary current $I_1$ is determined by the gate signal applied to the thyristors as is well known in the art. Since the current phase is fixed, under a transient state in which the operation of the motor is changed from the powering mode to the regeneration mode or vice versa, the phases of $E_1$, $E_2$ and $\Phi$ vary to establish the desired phase relationship for the new operation state.

The speed at which the phases of the induced voltage and the magnetic flux vary is determined by the secondary time constant $$T_2 = (L_2 + L_m)/R_2$$

where
$L_2$: secondary circuit inductance as viewed from primary side
$L_m$: excitation mutual inductance of the motor
$R_2$: secondary circuit resistance as viewed from primary side.

Generally, the secondary time constant $T_2$ is of the order of several hundred milliseconds so that even when the polarity of the output of the speed controller is reversed and an instruction for changing the operation mode from powering to regeneration or vice versa is produced, desired torque would not be produced until the phase of flux $\Phi$ stabilizes at a desired phase angle. For this reason, under these transient states, even when the primary current is increased the torque would not increase correspondingly. Furthermore, when the load varies during the powering or regeneration mode operation the phase of the flux $\Phi$ should be varied in order that the power factor angle $\phi$ becomes a predetermined value so that the torque would not increase corresponding to the increase in the current under transient state. In short, with the prior art control system, since the current phase is fixed it is impossible to obtain desired torque under transient state and hence quick response speed control.

SUMMARY OF THE INVENTION

It is an object of this invention to provide an improved control system of an alternating current motor which can quickly vary the torque in response to load variation.

Another object of this invention is to provide a control system of an alternating current motor energized by a rectifier-inverter type frequency converter wherein the torque of the motor can be varied commensurate with the variation of the motor current independently of the secondary time constant of the motor thus simplifying the control system.

Still another object of this invention is to provide a control system of an alternating current motor capable of varying the torque of the motor at high response speed when the load of the motor changes thus efficiently utilizing the motor capacity.

According to the invention, there is provided a control system of an alternating current motor energized by a frequency converter of the class wherein the speed of the motor is controlled by varying the phase of the output current of the frequency converter by shifting the phase of a control signal of the frequency converter, wherein there is provided a function generator supplied with a first signal related to a torque generated by the motor for generating a second signal corresponding to the phase of a primary current of the motor, and a phase shifter for shifting the phase of said control signal in accordance with the second signal.

According to a preferred embodiment of this invention there is provided a control system of an alternating current motor energized by a frequency converter including serially connected rectifier and inverter of the class comprising a speed controller which generates a speed control signal in response to the speed of the motor and a reference signal, a current controller for generating a current control signal in response to the speed control signal and current flowing through the frequency controller, a phase controller responsive to the current control signal for controlling the phase of a first control signal for the rectifier, means responsive to the speed control signal for generating a slip frequency signal, an oscillator responsive to the speed of the motor and the slip frequency signal, means connected to the output of the oscillator for generating a second control signal for controlling the inverter, characterized in that there are provided a function generator responsive to the motor torque for generating an analogue phase angle signal related to the phase angle between the primary current and the magnetic flux of the motor, and a phase shifter connected to receive the analogue phase angle signal, the output of the oscillator and the sum of the slip frequency signal and the speed signal for generating the second control signal.

BRIEF DESCRIPTION OF THE DRAWINGS

In the accompanying drawings:

FIGS. 5a and 5b show the relationship between the magnetic flux and the primary current during powering mode and regeneration mode and FIG. 5c is a graph showing the relationship between the current phase angle and the primary current during the powering and regeneration modes;

DESCRIPTION OF THE PREFERRED EMBODIMENTS

Figure 3:
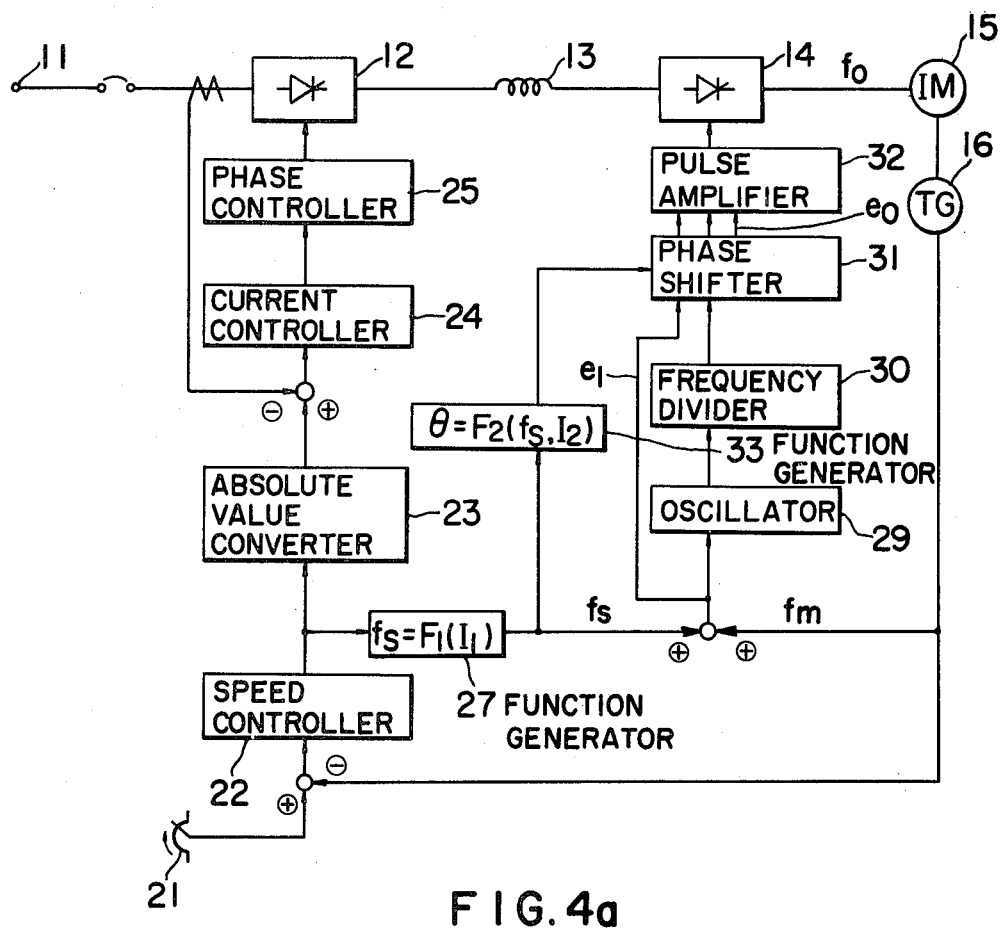
FIG. 3 is a block diagram showing one embodiment of this invention.

A preferred embodiment of this invention shown in FIG. 3 comprises a function generator 33 which performs a predetermined mathematical operation in response to a slip frequency signal fs for producing an analogue phase angle signal related to a current phase angle $\theta$, which is applied to a phase shifter 31 connected between a frequency divider 30 and a pulse amplifier 32. The phase shifter 31 is further supplied with a signal $e_1$ corresponding to the sum of the slip frequency signal fs and an actual speed signal fm and the output of the frequency divider 30 to form a control signal which is applied to the pulse amplifier 32. Although in FIG. 3, the compounding of a control signal for one phase is shown, a plurality of control signals are formed in the same manner for a polyphase circuit. The other component parts are identical to those shown in FIG. 1.

Figure 4A:
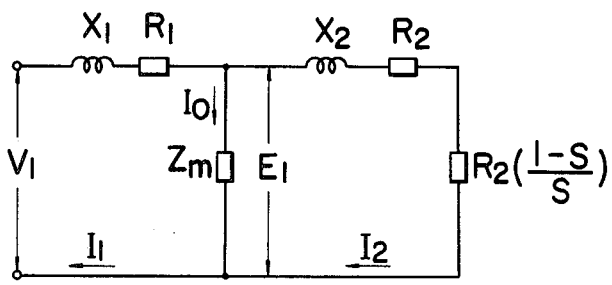
FIGS. 4a and 4b show equivalent circuits of an alternating current motor.
Figure 4B:
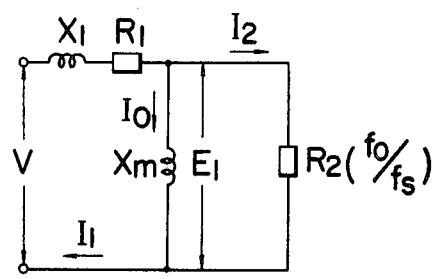

FIGS. 4a and 4b are equivalent circuits of an induction motor useful to explain the operation of the embodiment shown in FIG. 3. FIG. 4b is a simplified circuit obtainable by assuming that the secondary leakage reactance $X_2$, the exciting current $I_0$ and the magnetic flux $\Phi$ have the same phase. The following analysis concerns FIG. 4b.

Figure 1:
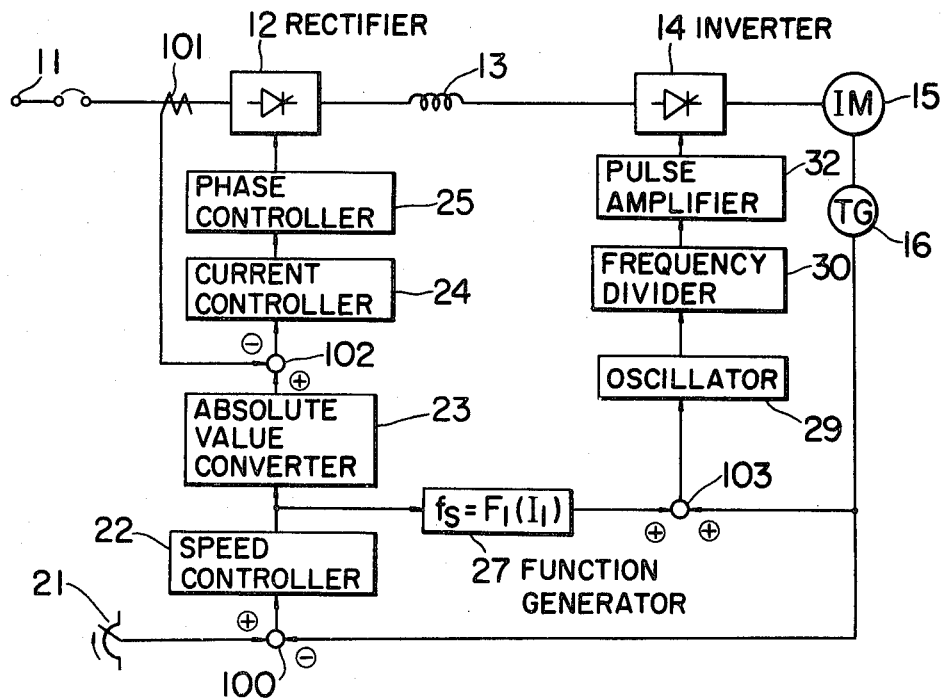
FIG. 1 is a block diagram showing a prior art control system of an alternating current motor energized by a frequency changer constituted by serially connected rectifier and inverter.
Figure 2A:
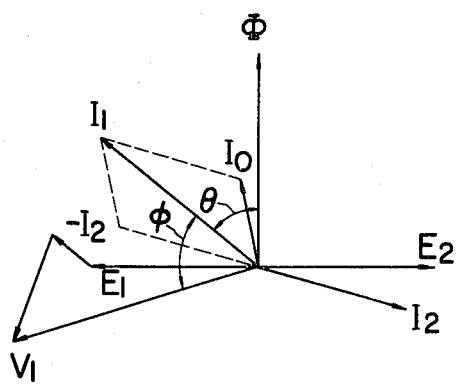
FIGS. 2a and 2b show vector diagrams showing powering mode and regeneration mode operations respectively of the alternating current motor.
Figure 2B:
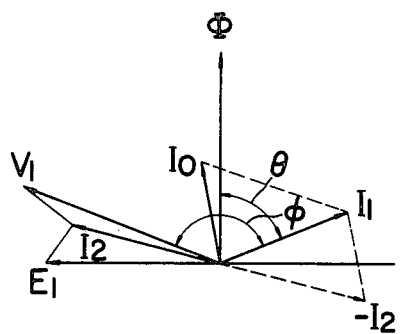

When the magnetic flux $\Phi$ is controlled to be constant by the control system shown in FIG. 1 or 3 under an assumption that the exciting current $I_0$ is constant, from FIG. 4b.

$$I_2 = \frac{E_1}{R_2(f_0/f_s)} = \frac{f_s}{R_2} \cdot \left(\frac{E_1}{f_0}\right) \quad (1)$$

$$\Phi = K_1 \cdot \left(\frac{E_1}{f_0}\right) = \text{constant} \quad (2)$$

$$I_0 = \frac{E_1}{X_m} = \frac{1}{2\pi L_m} \cdot \left(\frac{E_1}{f_0}\right) = \text{constant} \quad (3)$$

$$\therefore I_2 = K_2 \cdot f_s \quad (4)$$

where $K_1$ and $K_2$ are proportionality constants. More particularly, when the ratio of the primary voltage $E_1$ to the output frequency $f_0$ is controlled to be constant, the magnetic flux $\Phi$ and the exciting current $I_0$ become constant and the slip frequency $f_s$ and the secondary current $I_2$ become proportional with each other. For this reason, it is possible to determine the secondary current $I_2$ where the slip frequency $f_2$ is known and the ratio $E_1/f_0$ of the motor can be determined as a constant. As a consequence, the angle between the primary current $I_1$ and the magnetic flux $\Phi$, that is the current phase angle $\theta$ is shown by $$\theta = \tan^{-1}(I_2/I_0)$$

Thus, where the ratio of the rated secondary current $I_{2n}$ to the exciting current $I_0$ is given, the current phase angle can readily be given, thus $$\frac{I_{2n}}{I_0} = k \quad (6)$$

$$I_2(pu) = \frac{I_2}{I_{2n}} \quad (7)$$

$$\therefore \theta = \tan^{-1}\left(\frac{I_2}{I_{2n}} \cdot k\right)$$
$$= \tan^{-1}[I_2(pu) \cdot k]$$
$$= \tan^{-1}[F(f_s \cdot k)] \quad (8)$$

where $I_2(pu)$ represents a magnifying factor regarding rated value. Consequently, when the slip frequency $f_s$, the current ratio k or the $I_2(pu)$ and k are given, the current phase angle $\theta$ can be determined as a function thereof.

FIG. 5c is a graph showing the relationship between $I_2(pu)$ and $\theta$ of FIG. 5a and FIG. 5b show the angle $\theta$ between the magnetic flux $\Phi$ and the primary current $I_1$ wherein $\theta$ during the powering is shown as positive while that during the regeneration as negative.

Figure 6A:
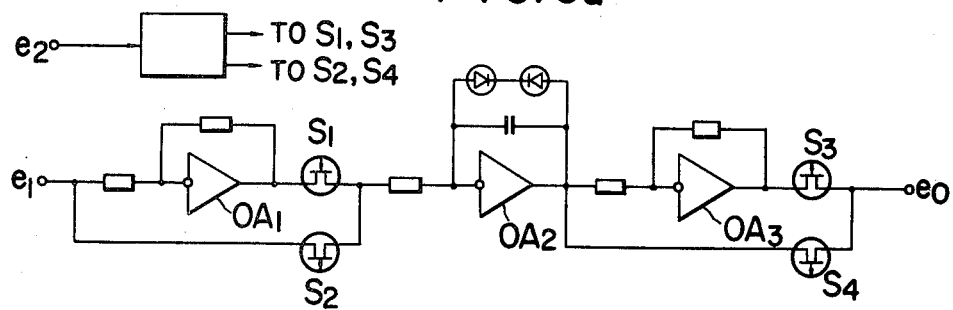
FIG. 6a is a connection diagram showing a phase shifter utilized in this invention.

FIG. 6a shows the circuit diagram of the phase shifter 31. As shown it comprises an inverter $OA_1$ which inverts the polarity of an input analogue signal $e_1$ that varies in proportion to the output frequency $f_0$ of inverter 14. Accordingly, inputs to semiconductor switches $S_1$ and $S_2$ have the same magnitude but opposite polarity. There is further provided an integrator $OA_2$ which integrates input signal $e_1$ for one half period of the output frequency $f_0$ so as to produce an output voltage which is constant irrespective of the variation in the output frequency $f_0$. An inverter $OA_3$ and semiconductor switches $S_3$ and $S_4$ which are similar to inverter $OA_1$ and semiconductor switches $S_1$ and $S_2$ are connected to the output of integrator $OA_2$. As a signal $e_2$ for alternately ON-OFF control semiconductor switches $S_1$ and $S_3$, and $S_2$ and $S_4$ can be used the output of frequency divider 30 since it produces a signal corresponding to the output frequency $f_0$ and this signal is applied to inverter 14 through pulse amplifier 32 for controlling the output frequency $f_0$ thereof.

Figure 6B:
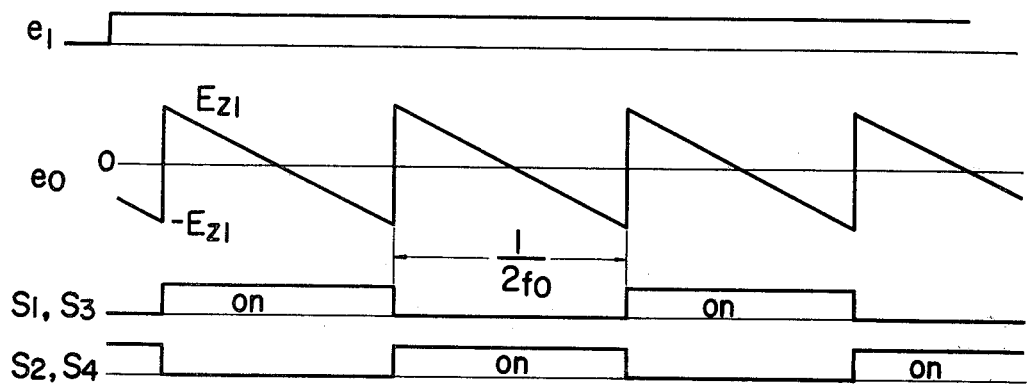
FIGS. 6b and 7 are waveforms for explaining the operation of the phase shifter.

Supposing that signal $e_1$ is positive, when switch $S_1$ is ON, a negative input signal is applied to integrator $OA_2$ whereas when switch $S_2$ is ON a positive input signal is applied to integrator $OA_2$. Then the output of this integrator changes from positive to negative polarity in response to the positive input signal, whereas from negative to positive in response to the negative input signal. As above described, when switches $S_1$ and $S_2$ are alternately rendered ON for $\frac{1}{2}$ period of the output frequency $f_0$, the output signal for integrator varies alternately between positive and negative values $E_{z1}$ and $E_{z1}$ which are constant irrespective of the output frequency. When this voltage is applied to inverter $OA_3$ and when switches $S_3$ and $S_4$ are alternately rendered ON for $\frac{1}{2}$ period of the output frequency $f_0$, a sawtooth wave output $e_0$ as shown in FIG. 6b can be obtained having a period of $\frac{1}{2}$ of the output frequency. With this connection, when a signal proportional to the output frequency $f_0$ is supplied to input terminal $e_1$ of the phase shifter, a sawtooth wave as shown by FIG. 6b appears at the output terminal $e_0$. This output signal repeats the same wave shape at each one half period of the output frequency and has a constant crest value $E_{z1}$ irrespective of the output frequency $f_0$.

Figure 7:
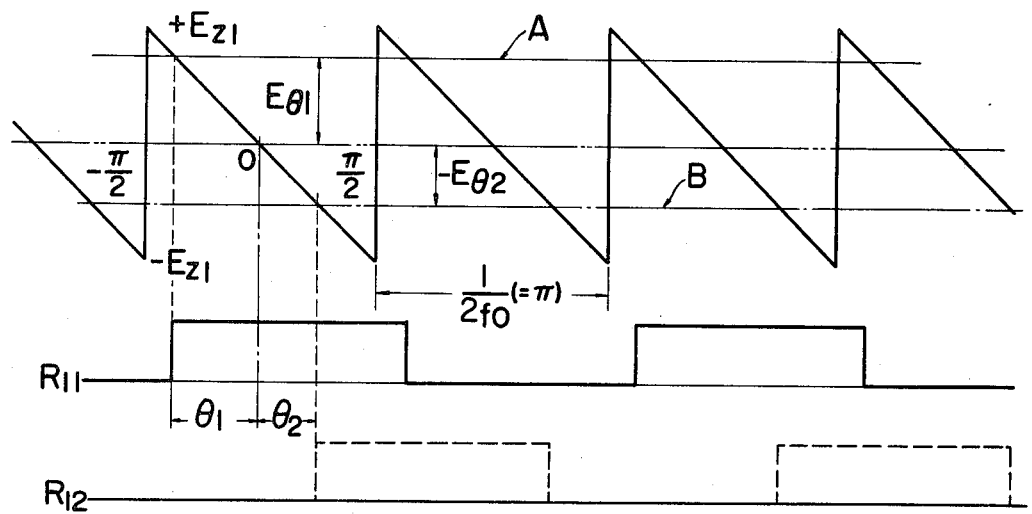

FIG. 7 shows waveforms showing the manner of processing the output of the phase shifter shown in FIG. 6. More particularly, when the phase shifter is constructed such that signals are produced at the crosspoints between output signal $e_0$ and horizontal line A or B, signals $R_{11}$ and $R_{12}$ having different phases can be produced.

By combining these operations, it is possible to control the current phase of the induction motor. Thus, in the embodiment shown in FIG. 3, the function generator 33 generates an analogue phase angle signal related to the current phase angle in accordance with the slip frequency $f_s$, while the phase shifter 31 generates a sawtooth wave $e_0$ shown in FIGS. 6 and 7. The control signal is compounded at the cross-points between the sawtooth wave $e_0$ and the analogue phase angle signal and applied to the inverter 14 via pulse amplifier 32 to control the phase of the output alternating current. Of course, control signals of the same number as the number of phases of the output alternating current are formed.

Figure 8:
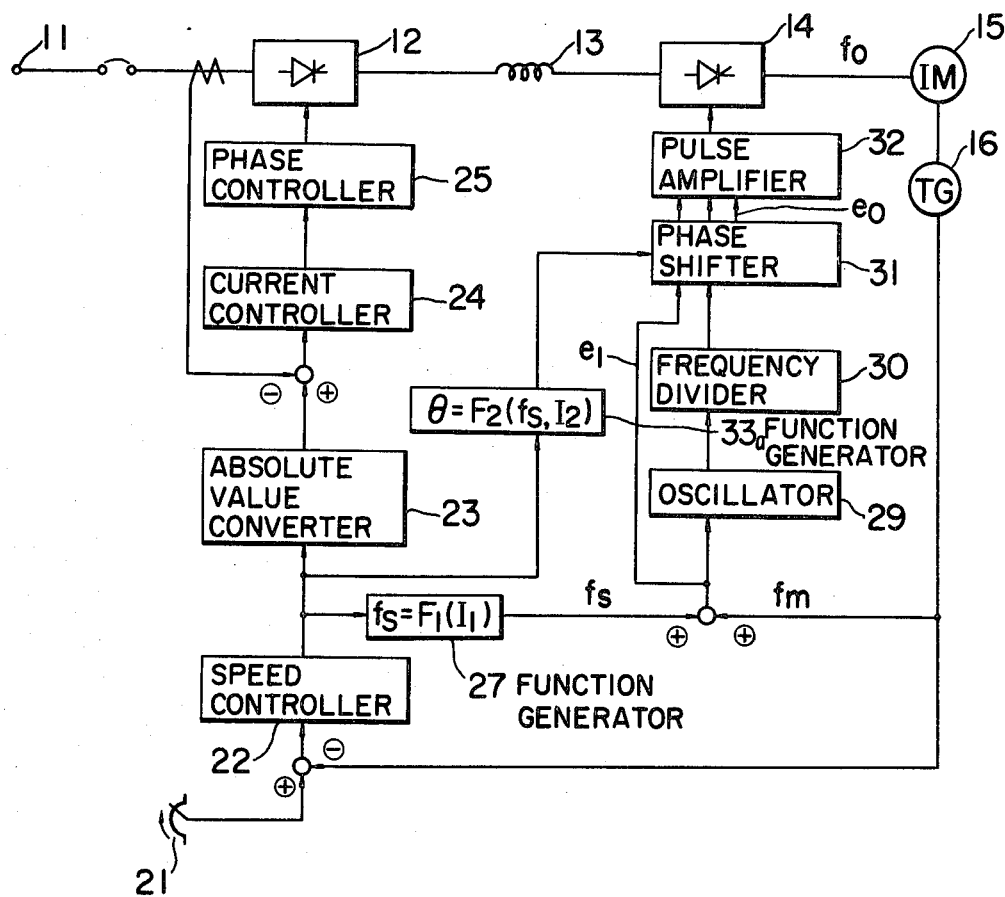
FIG. 8 is a block diagram showing a modified embodiment of this invention.

FIG. 8 shows a modified embodiment of this invention in which the output of the speed controller 22 is applied to the function generator 33a whereby it generates a function of angle $\theta$ of primary current $I_1$. This function generator 33a corresponds to the combination of function generators 27 and 33 shown in FIG. 3 and generates an analogue phase angle signal.

Thus, it is possible to establish a function equation showing the relationship between the secondary current $I_2$ and the current phase angle $\theta$ from the equivalent circuit shown in FIG. 4a, or to obtain the current phase angle signal from the functional relationship between it and a signal related to the motor torque. Among signals related to the motor torque are included signals representing secondary current $I_2$, primary current $I_1$, a torque reference, a slip reference $f_s$, magnetic flux $\Phi$, and induced electromotive forces $E_1$ and $E_2$.

The analogous phase angle signal can also be formed by correcting the current phase angle $\theta$ by a delay angle caused by commutation necessary for operating thyristors utilized in the rectifier and the inverter of the frequency converter. As is well known in the art, the thyristor gate signal and the output current phase of such converter are not at the same phase due to commutation, so that it is necessary to precorrect the delay caused by this fact.

Figure 9:
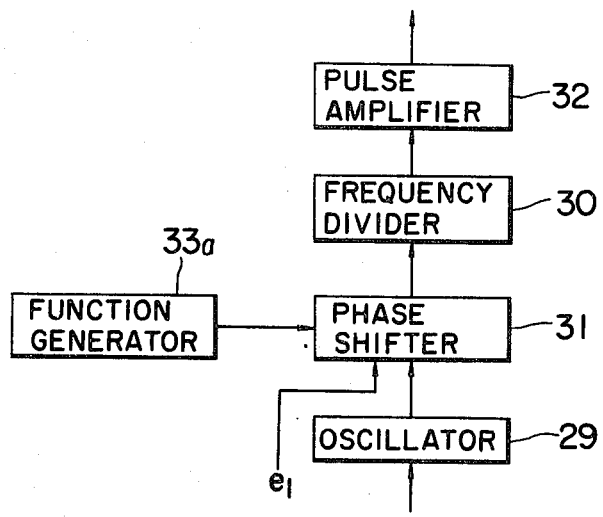
FIG. 9 is a partial block diagram showing still further modification of this invention.

FIG. 9 shows still another modification of this invention in which phase shifter 31 is interposed between oscillator 29 and frequency divider 30 so as to divide the frequency of a phase shifted signal for determining the current phase.

The sawtooth wave and the control pulses $R_{11}$ and $R_{12}$ can also be formed by any other well known circuits than those illustrated in FIGS. 6 and 7. It will be clear that many other well known circuits can be used for shifting the phase of the input control signal to the phase shifter by an angle corresponding to the analogue phase angle signal. Furthermore, it is also possible to produce a digital signal from the function generator 33 and to shift its phase by means of an adder of subtractor.

As above described, according to this invention, there is provided a control system of an alternating current motor energized by a frequency converter wherein a second signal corresponding to the primary current phase of the motor is produced from a first signal related to the motor torque and the frequency converter is controlled in accordance with a change in the second signal caused by a change in the first signal so that it is possible not only to provide an anticipation control of the current phase but also to vary the torque commensurate with the current variation. Moreover, as the variation in the torque is independent of the secondary time constant of the motor it is possible to avoid complication of the control circuit. Further, as it is possible to stepwisely vary the torque the response speed of the control system is increased. In this manner, the capacity of the motor is efficiently utilized so that it is possible to decrease its capacity and overcurrent value.

I claim:

1. In a control system of an alternating current motor energized by a current control frequency converter of the class wherein the speed of the motor is controlled by varying the phase of the output current of the frequency converter by shifting the phase of a control signal of said frequency converter, the improvement which comprises a function generator supplied with a first signal including a speed control signal form by a speed controller in response to an actual speed of said motor and a speed reference signal for generating a second signal corresponding to the phase of a primary current of said motor, and a phase shifter for shifting the phase of said control signal in accordance with said second signal.

2. In a current control system of an alternating current motor energized by a frequency converter including serially connected rectifier and inverter of the class comprising a speed controller which generates a speed control signal in response to the speed of said motor and a reference speed, a current controller for generating a current control signal in response to said speed control signal and current flowing through said frequency converter, a phase controller responsive to said current control signal for controlling the phase of a first control signal for said rectifier, means responsive to said speed control signal for generating a slip frequency signal, an oscillator responsive to the speed of said motor and said slip frequency signal, means connected to the output of said oscillator for generating a second control signal for controlling said inverter, the improvement which comprises a function generator responsive to the motor torque for generating an analogue phase angle signal related to the phase angle between the primary current and magnetic flux of said motor, and a phase shifter connected to receive said analogue phase angle signal, the output of said oscillator and the sum of said slip frequency signal and said speed signal for generating said second control signal.

3. The control system according to claim 2 wherein said function generator is connected between the output of said means for generating said slip frequency signal and said phase shifter.

4. The control system according to claim 2 wherein said function generator is connected between the output of said speed controller and said phase shifter.

5. The control system according to claim 2 which further comprises a frequency divider connected between said oscillator and said phase shifter.

6. The control system according to claim 2 which further comprises a frequency divider connected on the output side of said phase shifter.

* * * * *